(12) United States Patent
Okamoto

(10) Patent No.: US 9,570,235 B2
(45) Date of Patent: Feb. 14, 2017

(54) MULTILAYER CERAMIC CAPACITOR

(71) Applicant: Murata Manufacturing Co., Ltd., Nagaokakyo, Kyoto-fu (JP)

(72) Inventor: Takafumi Okamoto, Nagaokakyo (JP)

(73) Assignee: Murata Manufacturing Co., Ltd., Kyoto (JP)

( * ) Notice: Subject to any disclaimer, the term of this patent is extended or adjusted under 35 U.S.C. 154(b) by 0 days.

(21) Appl. No.: 14/983,859

(22) Filed: Dec. 30, 2015

(65) Prior Publication Data

US 2016/0111213 A1 Apr. 21, 2016

Related U.S. Application Data

(63) Continuation of application No. PCT/JP2014/064886, filed on Jun. 4, 2014.

(30) Foreign Application Priority Data

Jul. 9, 2013 (JP) .................. 2013-143993

(51) Int. Cl.
*H01G 4/10* (2006.01)
*H01G 4/12* (2006.01)
(Continued)

(52) U.S. Cl.
CPC ........... *H01G 4/1227* (2013.01); *C04B 35/468* (2013.01); *C04B 35/4682* (2013.01);
(Continued)

(58) Field of Classification Search
CPC .................................................. H01G 4/1227
See application file for complete search history.

(56) References Cited

U.S. PATENT DOCUMENTS 6,074,970 A 6/2000 Yamashita et al.
6,205,014 B1* 3/2001 Inomata ................. H01G 4/30
361/312

(Continued)

FOREIGN PATENT DOCUMENTS

JP 11-236264 A 8/1999
JP 2005-132645 A 5/2005
(Continued)

OTHER PUBLICATIONS

Official Communication issued in International Patent Application No. PCT/JP2014/064886, mailed on Aug. 26, 2014.

*Primary Examiner* — Karl Group
(74) *Attorney, Agent, or Firm* — Keating & Bennett, LLP

(57) ABSTRACT

A multilayer ceramic capacitor that is highly resistant to insulation degradation under high-temperature load includes an inner ceramic layer that has a composition mainly composed of a perovskite-type compound containing Ba and Ti, at least one of Nb and Ta, contains Mn and Al, and optionally contains Mg and a rare-earth element that is at least one of Y, Gd, Tb, Dy, Ho, and Er, with a content of Ti being 100 parts by mole, and (a) a total of Nb and Ta is from about 0.2 to about 1.5 part by mole, (b) Mg is not more than about 0.2 part by mole including 0 part by mole, (c) Mn is from about 1.0 to about 3.5 parts by mole, (d) Al is from about 1.0 to about 4.0 parts by mole, and (e) the rare-earth element is not more than about 0.05 part by mole including 0 part by mole. Furthermore, an average number of particles per one layer of the inner ceramic layer is not more than 3.

5 Claims, 1 Drawing Sheet

(51) Int. Cl.
*H01G 4/30* (2006.01)
*C04B 35/468* (2006.01)
*H01G 4/012* (2006.01)
*H01G 4/242* (2006.01)
*H01B 3/12* (2006.01)

(52) U.S. Cl.
CPC ............. *H01G 4/012* (2013.01); *H01G 4/242* (2013.01); *H01G 4/30* (2013.01); *C04B 2235/3206* (2013.01); *C04B 2235/3217* (2013.01); *C04B 2235/3224* (2013.01); *C04B 2235/3225* (2013.01); *C04B 2235/3251* (2013.01); *C04B 2235/3262* (2013.01); *H01B 3/12* (2013.01)

(56) References Cited

U.S. PATENT DOCUMENTS 9,362,053 B2* 6/2016 Okamoto ............. H01G 4/1227
9,373,445 B2* 6/2016 Okamoto ................. H01G 4/30
2006/0251927 A1 11/2006 Umeda et al.
2011/0157769 A1 6/2011 Kang et al.
2014/0049876 A1 2/2014 Yao et al.
2015/0103467 A1* 4/2015 Okamoto ................. H01G 4/30
  361/301.4
2015/0109717 A1* 4/2015 Okamoto ............. H01G 4/1227
  361/301.4

FOREIGN PATENT DOCUMENTS

| JP | 2006-36606 A | 2/2006 |
| JP | 2006-287046 A | 10/2006 |
| JP | 2010-232248 A | 10/2010 |
| JP | 2011-136896 A | 7/2011 |
| WO | 2013/018789 A1 | 2/2013 |

* cited by examiner

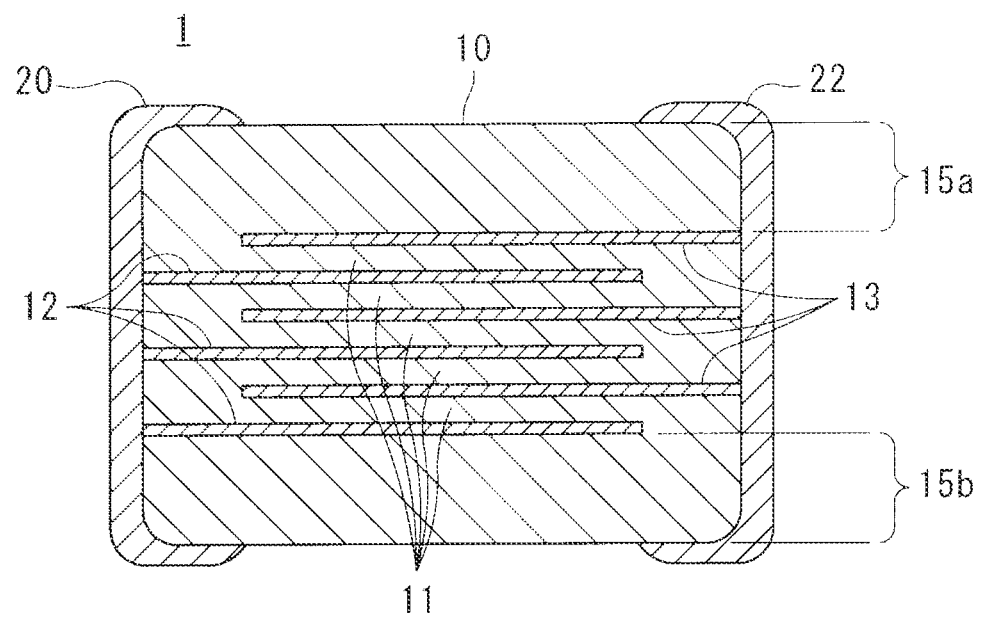

MULTILAYER CERAMIC CAPACITOR

BACKGROUND OF THE INVENTION

1. Field of the Invention

The present invention relates to a multilayer ceramic capacitor.

2. Description of the Related Art

A large number of dielectric ceramic compositions composed mainly of $BaTiO_3$, for example, have already conventionally been proposed as dielectric materials for a multilayer capacitor which do not become semiconducting even after firing under a low partial pressure of oxygen and which have flat temperature characteristics of a capacitance.

With development of electronic technology in recent years, electronic devices have increasingly become highly sophisticated in function and highly integrated, and conditions for use of a multilayer ceramic capacitor have increasingly become severe.

In particular, with higher integration of electronic devices, an ambient temperature of a multilayer ceramic capacitor mounted in the vicinity of a heat generating element such as a CPU operating at a high frequency has become increasingly higher than in a conventional example, and influence on reliability has been a concern.

On the other hand, in order to meet the demand for a small size and a larger capacitance of a multilayer ceramic capacitor as described previously, there is also a need for a decrease in thickness of a dielectric ceramic layer and for an increase in a number of dielectric ceramic layers.

Under such circumstances, both of a smaller size and a larger capacitance and improvement in dielectric strength have been demanded for a multilayer ceramic capacitor. Therefore, a dielectric ceramic composition having a high dielectric constant, flat temperature characteristics of a relative permittivity, and that is excellent in dielectric strength and reliability in spite of a decrease in thickness of a dielectric ceramic layer has been required as a dielectric ceramic composition to be used for this multilayer ceramic capacitor.

For example, in order to meet the demand described above, Japanese Patent Laying-Open No. 2005-132645 proposes a dielectric ceramic composition expressed by a composition formula: $100(Ba_{1-x}Ca_x)_mTiO_3+aMnO+bNb_2O_5+cSiO_2+dRe_2O_3$, where Re represents at least one metal element selected from among Y, Eu, Gd, Tb, Dy, Ho, Er, Tm, and Yb, and a, b, c, and d represents a molar ratio, and conditions of $0.01 \le a \le 5$, $0.05 \le b \le 2$, $0.4 \le c \le 8$, $0.05 \le d \le 2.5$, $0.01 \le x \le 0.20$, and $0.99 \le m \le 1.03$ are satisfied.

The multilayer ceramic capacitor containing the dielectric ceramic composition in Japanese Patent Laying-Open No. 2005-132645, however, has disadvantageously been great in changes over time in insulation resistance under high-temperature load and also has been insufficient in reliability.

SUMMARY OF THE INVENTION

Therefore, preferred embodiments of the present invention provide a multilayer ceramic capacitor that is highly resistant to insulation degradation under high-temperature load.

According to a preferred embodiment of the present invention, a multilayer ceramic capacitor includes a multilayer body including a plurality of dielectric ceramic layers and a plurality of internal electrodes along an interface between the dielectric ceramic layers and a plurality of external electrodes on an outer surface of the multilayer body and electrically connected to the internal electrodes, wherein a composition of the dielectric ceramic layer is mainly composed of a perovskite-type compound containing Ba and Ti, contains at least one of Nb and Ta, contains Mn and Al, and optionally contains Mg and a rare-earth element that is at least one of Y, Gd, Tb, Dy, Ho, and Er, with a content of Ti being 100 parts by mole, (a) a total of Nb and Ta is from about 0.2 to about 1.5 part by mole, (b) Mg is not more than about 0.2 part by mole including 0 part by mole, (c) Mn is from about 1.0 to about 3.5 parts by mole, (d) Al is from about 1.0 to about 4.0 parts by mole, and (e) the rare-earth element is not more than about 0.05 part by mole including 0 part by mole, and an average number of particles per one layer of the dielectric ceramic layer is not more than 3. The "average number of particles per one layer of the dielectric ceramic layer" means an average number of ceramic particles or ceramic grain boundaries present along a direction of thickness of one dielectric ceramic layer.

In a preferred embodiment of the present invention, since a rare-earth element included in a dielectric ceramic layer is not more than about 0.05 part by mole including 0 part by mole, a multilayer ceramic capacitor is excellent in resistance to insulation degradation under high-temperature load. Furthermore, since the average number of particles or average number of grain boundaries per one layer of the dielectric ceramic layer is as small as at most 3, failure due to a grain boundary is significantly decreased and higher resistance to insulation degradation is achieved.

Therefore, a synergistic effect of the rare-earth element contained in the dielectric ceramic layer being not more than about 0.05 part by mole including 0 part by mole and the average number of particles or average number of grain boundaries per one layer of the dielectric ceramic layer being not more than 3 brings about noticeable resistance to insulation degradation.

According to various preferred embodiments of the present invention, a multilayer ceramic capacitor that is excellent in resistance to insulation degradation under high-temperature load is provided.

The above and other elements, features, steps, characteristics and advantages of the present invention will become more apparent from the following detailed description of the preferred embodiments with reference to the attached drawings.

BRIEF DESCRIPTION OF THE DRAWINGS

FIG. 1 is a cross-sectional view showing a preferred embodiment of a multilayer ceramic capacitor according to the present invention.

DETAILED DESCRIPTION OF THE PREFERRED EMBODIMENTS

Preferred embodiments of a multilayer ceramic capacitor according to the present invention will be described, together with a method of manufacturing the same.

FIG. 1 is a vertical cross-sectional view along a direction of length (L) showing a multilayer ceramic capacitor 1. The multilayer ceramic capacitor 1 includes a ceramic main body 10 and external electrodes 20 and 22 located at left and right end portions of the ceramic main body 10.

The ceramic main body 10 preferably has a multilayer body structure with a parallelepiped or substantially parallelepiped shape including a plurality of inner ceramic layers 11, a plurality of internal electrodes 12 and 13 disposed at an interface between the plurality of inner ceramic layers 11, and outer ceramic layers 15a and 15b disposed above and below the plurality of inner ceramic layers 11 with the plurality of inner ceramic layers 11 located therebetween.

The internal electrode 12 and the internal electrode 13 are opposed to each other with the inner ceramic layer 11 located therebetween in a direction of thickness. A capacitance is generated in a portion where the internal electrode 12 and the internal electrode 13 are opposed to each other with the inner ceramic layer 11 located therebetween.

A left end portion of the internal electrode 12 extends to a left end surface of the ceramic main body 10 and is electrically connected to the external electrode 20. A right end portion of the internal electrode 13 extends to a right end surface of the ceramic main body 10 and is electrically connected to the external electrode 22.

The inner ceramic layer 11 is composed of a dielectric ceramic composition. The outer ceramic layers 15a and 15b disposed above and below are also composed of a dielectric ceramic composition that is preferably the same as that for the inner ceramic layer 11. The outer ceramic layers 15a and 15b may be composed of a dielectric ceramic composition which is different from that for the inner ceramic layer 11.

A composition of the inner ceramic layer 11 is mainly composed of a perovskite-type compound containing Ba and Ti, contains at least one of Nb and Ta, contains Mn and Al, and optionally contains Mg and a rare-earth element that is at least one of Y, Gd, Tb, Dy, Ho, and Er, and with a content of Ti being 100 parts by mole, and (a) a total of Nb and Ta is from about 0.2 to about 1.5 part by mole, (b) Mg is not more than about 0.2 part by mole including 0 part by mole, (c) Mn is from about 1.0 to about 3.5 parts by mole, (d) Al is from about 1.0 to about 4.0 parts by mole, and (e) the rare-earth element is not more than about 0.05 part by mole including 0 part by mole.

Furthermore, an average number of particles per one layer of the inner ceramic layer 11 is not more than 3. The "average number of particles per one layer of the inner ceramic layer 11" means an average number of ceramic particles or ceramic grain boundaries present along a direction of thickness of one inner ceramic layer 11.

In the multilayer ceramic capacitor 1 constructed as described above, since a rare-earth element included in the inner ceramic layer 11 is not more than about 0.05 part by mole including 0 part by mole, a multilayer ceramic capacitor is excellent in resistance to insulation degradation under high-temperature load. Furthermore, since the average number of particles or average number of grain boundaries per one layer of the inner ceramic layer 11 is as small as at most 3, failure due to a grain boundary lessens and higher resistance to insulation degradation is achieved.

Therefore, a synergistic effect of the rare-earth element contained in the inner ceramic layer 11 being not more than about 0.05 part by mole including 0 part by mole and the average number of particles or average number of grain boundaries per one layer of the inner ceramic layer 11 being not more than 3 brings about such a synergistic effect as noticeable resistance to insulation degradation.

A non-limiting example of a method of manufacturing the multilayer ceramic capacitor 1 will now be described.

Initially, source material powders for a dielectric ceramic composition are weighed and prepared. The source material powders for the dielectric ceramic composition are mainly composed of a perovskite-type compound containing Ba and Ti. As a sub component, at least one of Nb and Ta is contained, Mn and Al are contained, and optionally Mg and a rare-earth element that is at least one of Y, Gd, Tb, Dy, Ho, and Er are contained, and with a content of Ti being 100 parts by mole, and (a) a total of Nb and Ta is from about 0.2 to about 1.5 part by mole, (b) Mg is not more than about 0.2 part by mole including 0 part by mole, (c) Mn is from about 1.0 to about 3.5 parts by mole, (d) Al is from about 1.0 to about 4.0 parts by mole, and (e) the rare-earth element is not more than about 0.05 part by mole including 0 part by mole. This dielectric ceramic composition is a non-reducing dielectric material, and it can be sintered without becoming semiconducting even after firing in a reducing atmosphere.

Thereafter, the source material powders for the dielectric ceramic composition are slurried. This slurry is formed into a sheet shape to obtain a ceramic green sheet for the inner ceramic layer 11 and the outer ceramic layers 15a and 15b.

Then, the internal electrodes 12 and 13 are formed on a surface of the ceramic green sheet for the inner ceramic layer 11. The internal electrodes 12 and 13 are formed from at least one conductive material selected from among Ni, an Ni alloy, Cu, and a Cu alloy. The internal electrodes 12 and 13 are formed through a screen printing method or a transfer method, with a conductive paste formed from a conductive material.

Then, a necessary number of ceramic green sheets for the inner ceramic layer 11 each having the internal electrodes 12 and 13 formed thereon are stacked, and thereafter these ceramic green sheets are sandwiched between the ceramic green sheets for the outer ceramic layers 15a and 15b to form a multilayer body. As the multilayer body is subjected to thermocompression bonding, an unfired multilayer body is obtained.

Then, the unfired multilayer body is fired at a prescribed temperature in a prescribed reducing atmosphere to obtain sintered the ceramic main body 10 as shown in FIG. 1.

Thereafter, the external electrodes 20 and 22 are formed at opposing end portions of the ceramic main body 10, respectively. The external electrodes 20 and 22 are electrically connected to the internal electrodes 12 and 13, respectively. Ni, an Ni alloy, Cu, a Cu alloy, Ag, or an Ag alloy is preferably used for a material for the external electrodes 20 and 22. The external electrodes 20 and 22 are formed by applying a conductive paste obtained by adding glass frits to metal powders to opposing end portions of the ceramic main body 10 and then baking the conductive paste.

The conductive paste which is to define the external electrodes 20 and 22 may be applied to the unfired ceramic main body 10 and baked simultaneously with firing of the ceramic main body 10. As necessary, a plated layer of Ni, Cu, solder, Sn, or the like may be formed on the external electrodes 20 and 22.

With the method above, the multilayer ceramic capacitor 1 that is excellent in resistance to insulation degradation under high-temperature load is able to be reliably mass-produced.

EXAMPLES

1. Examples and Comparative Examples

Samples of multilayer ceramic capacitors 1 according to Examples and Comparative Examples were fabricated and subjected to counting of the average number of particles per one layer of the inner ceramic layer 11 and to a high-temperature load life test.

$BaCO_3$ powders and $TiO_2$ powders were prepared as the starting source materials for barium titanate representing a main component. Each material was weighted such that a content of Ba was 104 parts by mole with a content of Ti being 100 parts by mole, and the materials were mixed in a ball mill with water serving as a medium. Thereafter, the mixture was calcined at 1050° C., and the obtained calcined powders were crushed to obtain powders of barium titanate representing the main component. A Ba site of barium titanate may contain at least one of Ca and Sr, and a Ti site may contain at least one of Zr and Hf.

Then, $Nb_2O_5$, $Ta_2O_5$, $Dy_2O_3$, $Al_2O_3$, $MgCO_3$, or $MnCO_3$ was added to powders of barium titanate representing the main component as an additive component such that an amount of each sub component was set as shown in Table 1 (amounts denoted in parts by mole) with a content of Ti representing the main component being 100 parts by mole. Furthermore, 4.0 parts by mole of $SiO_3$ as a sintering aid were added with respect to the content of Ti of 100 parts by mole, and the materials were mixed in water in a ball mill to obtain powders of the dielectric ceramic composition.

As a result of ICP emission spectrochemical analysis, the obtained dielectric ceramic composition powders were confirmed to substantially be the same as the compositions shown in Table 1.

A polyvinyl butyral based binder and such an organic solvent as ethanol were added to the dielectric ceramic composition powders, and they were wet-mixed in a ball mill to fabricate a ceramic slurry. This ceramic slurry was formed, with a doctor blade method, into a ceramic green sheet for the inner ceramic layer 11 such that the fired inner ceramic layer 11 would have a thickness of about 3.0 µm. Similarly, a ceramic green sheet for the outer ceramic layers 15a and 15b having a prescribed thickness was formed.

Then, a conductive paste containing Ni as a conductive component was screen-printed on the ceramic green sheet for the inner ceramic layer 11 to form the internal electrodes 12 and 13.

Then, a plurality of ceramic green sheets each having the internal electrodes 12 and 13 formed thereon were stacked such that drawn portions of the internal electrodes 12 and 13 alternate. Thereafter, the ceramic green sheets each having the internal electrodes 12 and 13 formed thereon were sandwiched between the ceramic green sheets for the outer ceramic layers 15a and 15b to obtain the unfired ceramic main body 10 having a multilayer body structure.

Then, this unfired ceramic main body 10 was heated to 270° C. in an air atmosphere to burn the binder. Thereafter, the ceramic main body 10 was held for 2 hours at a firing temperature from 1140° C. to 1220° C. (Table 1 showing a firing temperature for each sample) in a reducing atmosphere at $PO_2=10^{-9}$ to $10^{-10.5}$ (atm) which was composed of an $H_2$—$N_2$—$H_2O$ gas, to obtain the dense sintered ceramic main body 10.

As a result of ICP emission spectrochemical analysis, the obtained ceramic main body 10 was confirmed to be substantially the same as the composition shown in Table 1 except for an Ni component in the internal electrodes 12 and 13.

Then, the external electrodes 20 and 22 made of Cu were baked on opposing end surfaces of the sintered ceramic main body 10 to obtain the multilayer ceramic capacitor 1 as the sample.

An outer dimension of the obtained multilayer ceramic capacitor 1 was 1.0 mm in width (W), 2.0 mm in length (L), and 0.7 mm in thickness (T). The inner ceramic layer 11 interposed between the internal electrodes 12 and 13 had a thickness of 3.0 µm and the internal electrodes 12 and 13 had a thickness of 1.0 µm. The total number of the effective inner ceramic layers 11 was 160 and an area of the opposing electrodes per one layer was 1.6 $mm^2$.

The average number of particles per one layer of the inner ceramic layer 11 was determined by using an intercept method.

Specifically, the multilayer ceramic capacitor 1 was cut at a position approximately ½ of a length (L) so that a sample of which WT cross-section was exposed was fabricated. Thereafter, in order to clarify a boundary (grain boundary) between grains of ceramics exposed at the WT cross-section, the sample was subjected to heat treatment. A temperature for heat treatment was set to a temperature at which grains would not grow but the grain boundaries would be clarified, and in the present example, the temperature was set to 1000° C.

At a position approximately ½ of a width (W) and a thickness (T) in the WT cross-section, grains in the inner ceramic layer 11 were observed at a magnification of 10,000 with a scanning electron microscope (SEM). In an obtained SEM image, 100 lines perpendicular or substantially perpendicular to the internal electrodes 12 and 13 were randomly drawn at intervals not smaller than about 2 µm, for example. Consequently, one line had a length substantially comparable to a thickness (e.g., about 3.0 µm) of one layer of the inner ceramic layer 11. Then, a value calculated by dividing the total number of ceramic particles crossed by each line by 100 was defined as the average number of particles per one layer of the inner ceramic layer 11.

In the high-temperature load life test, while a voltage at 30 V/3 µm (about 3 µm being a thickness of one layer of inner ceramic layer 11) was applied in an environment at a temperature of 170° C., a change over time in insulation resistance of the multilayer ceramic capacitor 1 was determined. When a value for insulation resistance was equal to or lower than 50 kΩ, determination as a failure was made, and a 50% mean time to failure (MTTF) was found through Weibull analysis of a failure period. An example in which the MTTF was shorter than 150 hours was defined as non-conforming. The number of samples was set to 100.

A dielectric constant of the inner ceramic layer 11 was calculated from a capacitance of the multilayer ceramic capacitor 1.

Table 1 shows a result of counting of the average number of particles per one layer of the inner ceramic layer 11 and a result of evaluation of the high-temperature load life test. The multilayer ceramic capacitor 1 having a sample number with * was out of the scope of the present invention.

TABLE 1

| Sample Number | Composition (Parts by Mole) | | | | | | | | | Firing Temperature/ (° C.) | Average Number of Particles | High-Temperature Load Life Test MTTF/(h) |
| --- | --- | --- | --- | --- | --- | --- | --- | --- | --- | --- | --- | --- |
| | Nb | Ta | Mg | Al | Mn | Gd | Dy | Y | Er | | | |
| *1 | 0.1 | — | — | 1.0 | 1.5 | — | — | — | — | 1220 | 2.2 | 5 |
| *2 | 0.2 | — | — | 1.0 | 1.5 | — | — | — | — | 1140 | 9.8 | 10 |

TABLE 1-continued

| Sample Number | Composition (Parts by Mole) | | | | | | | | Firing Temperature/ (° C.) | Average Number of Particles | High-Temperature Load Life Test MTTF/(h) |
|---|---|---|---|---|---|---|---|---|---|---|---|
| | Nb | Ta | Mg | Al | Mn | Gd | Dy | Y | Er | | | |
| 3 | 0.2 | — | — | 1.0 | 1.5 | — | — | — | — | 1200 | 2.7 | 170 |
| *4 | 0.8 | — | — | 1.6 | 1.5 | — | — | — | — | 1140 | 8.7 | 30 |
| 5 | 0.8 | — | — | 1.6 | 1.5 | — | — | — | — | 1200 | 3.0 | 255 |
| *6 | 1.5 | — | — | 1.6 | 1.5 | — | — | — | — | 1140 | 9.1 | 45 |
| 7 | 1.5 | — | — | 1.6 | 1.5 | — | — | — | — | 1200 | 2.6 | 495 |
| *8 | 2.0 | — | — | 1.6 | 1.5 | — | — | — | — | 1200 | 2.8 | 15 |
| *9 | 1.0 | — | 0.1 | 1.0 | 2.0 | — | — | — | — | 1160 | 8.9 | 40 |
| 10 | 1.0 | — | 0.1 | 1.0 | 2.0 | — | — | — | — | 1220 | 2.8 | 310 |
| *11 | 1.0 | — | 0.2 | 1.0 | 2.0 | — | — | — | — | 1160 | 10.1 | 30 |
| 12 | 1.0 | — | 0.2 | 1.0 | 2.0 | — | — | — | — | 1220 | 2.1 | 270 |
| *13 | 1.0 | — | 0.3 | 1.0 | 2.0 | — | — | — | — | 1220 | 3.0 | 35 |
| *14 | 1.0 | — | 0.05 | 0.5 | 2.0 | — | — | — | — | 1180 | 9.4 | 5 |
| *15 | 1.0 | — | 0.05 | 1.0 | 2.0 | — | — | — | — | 1180 | 9.0 | 25 |
| 16 | 1.0 | — | 0.05 | 1.0 | 2.0 | — | — | — | — | 1220 | 2.8 | 240 |
| *17 | 1.0 | — | — | 4.0 | 1.5 | — | — | — | — | 1140 | 7.3 | 60 |
| 18 | 1.0 | — | — | 4.0 | 1.5 | — | — | — | — | 1180 | 2.1 | 285 |
| *19 | 1.0 | — | — | 5.0 | 1.5 | — | — | — | — | 1180 | 2.2 | 55 |
| *20 | 0.7 | — | — | 2.3 | 0.5 | — | — | — | — | 1220 | 2.7 | <5 |
| *21 | 0.7 | — | — | 2.3 | 1.0 | — | — | — | — | 1160 | 8.4 | 20 |
| 22 | 0.7 | — | — | 2.3 | 1.0 | — | — | — | — | 1220 | 2.3 | 195 |
| *23 | 0.7 | — | — | 2.3 | 3.5 | — | — | — | — | 1160 | 8.8 | 65 |
| 24 | 0.7 | — | — | 2.3 | 3.5 | — | — | — | — | 1220 | 2.3 | 320 |
| *25 | 0.7 | — | — | 2.3 | 5.0 | — | — | — | — | 1220 | 2.2 | 15 |
| *26 | — | 0.8 | — | 1.5 | 1.5 | — | — | — | — | 1140 | 9.1 | 35 |
| 27 | — | 0.8 | — | 1.5 | 1.5 | — | — | — | — | 1200 | 2.1 | 205 |
| *28 | — | 1.5 | 0.2 | 1.5 | 1.5 | — | — | — | — | 1140 | 10.3 | 40 |
| 29 | — | 1.5 | 0.2 | 1.5 | 1.5 | — | — | — | — | 1200 | 2.9 | 330 |
| *30 | 1.0 | — | 0.1 | 1.5 | 1.5 | — | 0.05 | — | — | 1160 | 9.9 | 30 |
| 31 | 1.0 | — | 0.1 | 1.5 | 1.5 | — | 0.05 | — | — | 1220 | 2.8 | 215 |
| *32 | 1.0 | — | 0.1 | 1.5 | 1.5 | — | 0.10 | — | — | 1220 | 3.0 | 15 |
| *33 | 1.0 | — | 0.1 | 1.5 | 1.5 | 0.05 | — | — | — | 1140 | 8.5 | 50 |
| 34 | 1.0 | — | 0.1 | 1.5 | 1.5 | 0.05 | — | — | — | 1220 | 2.5 | 250 |
| *35 | 1.0 | — | 0.1 | 1.5 | 1.5 | 0.10 | — | — | — | 1200 | 2.6 | 20 |
| *36 | 1.0 | — | 0.1 | 1.5 | 1.5 | — | — | — | 0.05 | 1180 | 9.7 | 25 |
| 37 | 1.0 | — | 0.1 | 1.5 | 1.5 | — | — | — | 0.05 | 1240 | 2.8 | 215 |
| *38 | 1.0 | — | 0.1 | 1.5 | 1.5 | — | — | — | 0.10 | 1240 | 2.9 | 10 |
| *39 | 1.0 | — | 0.1 | 1.5 | 1.5 | — | — | 0.05 | — | 1160 | 10.4 | 30 |
| 40 | 1.0 | — | 0.1 | 1.5 | 1.5 | — | — | 0.05 | — | 1240 | 2.8 | 205 |
| *41 | 1.0 | — | 0.1 | 1.5 | 1.5 | — | — | 0.10 | — | 1240 | 2.3 | 5 |

*representing being out of the scope of the present invention

It was confirmed from Table 1 that the multilayer ceramic capacitors 1 with sample numbers 3, 5, 7, 10, 12, 16, 18, 22, 24, 27, 29, 31, 34, 37, and 40 within the scope of the present invention had excellent high-temperature load life and also a high dielectric constant.

The multilayer ceramic capacitors 1 with sample numbers 3, 5, 7 . . . were such that a composition of the inner ceramic layer 11 was mainly composed of barium titanate, contained at least one of Nb and Ta, contained Mn and Al, and optionally contained Mg and a rare-earth element (at least one of Y, Gd, Dy, and Er), and with a content of Ti being 100 parts by mole, and (a) a total of Nb and Ta was from about 0.2 to about 1.5 part by mole, (b) Mg was not more than about 0.2 part by mole including 0, (c) Mn was from about 1.0 to about 3.5 parts by mole, (d) Al was from about 1.0 to about 4.0 parts by mole, and (e) the rare-earth element was not more than about 0.05 part by mole including 0, and an average number of particles per one layer of the inner ceramic layer 11 was not more than 3.

In such a case, resistance to insulation degradation under high-temperature load was better than in a case of a conventional rare earth composition (a composition in which a rare-earth metal was not less than 0.1 part by mole as in Japanese Patent Laying-Open No. 2005-132645). Namely, with a rare-earth element not less than a certain amount being provided, when the average number of particles per one layer of the inner ceramic layer 11 decreases, it becomes difficult to maintain insulation resistance under high-temperature load.

On the other hand, the multilayer ceramic capacitors 1 with sample numbers 1 and 8 that are out of the scope of the present invention (examples in which an amount of addition of Nb in inner ceramic layer 11 being excessively small or large) were significantly degraded in insulation resistance under high-temperature load even though the average number of particles per one layer of the inner ceramic layer 11 was not more than 3.

The multilayer ceramic capacitors 1 with sample numbers 2, 4, 6, 9, 11, 15, 17, 21, 23, 26, 28, 30, 33, 36, and 39 that are out of the scope of the present invention (examples in which the average number of particles per one layer of the inner ceramic layer 11 was more than 3 even though an amount of addition of Nb, Ta, and the like in the inner ceramic layer 11 was appropriate) were non-conforming, although insulation resistance under high-temperature load was not significantly degraded.

The multilayer ceramic capacitor 1 with sample number 13 that is out of the scope of the present invention (an example in which an amount of addition of Mg was more than about 0.2 part by mole even though an amount of addition of Nb or Ta in the inner ceramic layer 11 was appropriate) was degraded in insulation resistance under high-temperature load even though the average number of particles per one layer of the inner ceramic layer 11 was not more than 3.

The multilayer ceramic capacitors 1 with sample numbers 14 and 19 that are out of the scope of the present invention (examples in which an amount of addition of Al in inner ceramic layer 11 was out of the range from about 1.0 to about 4.0 parts by mole) were degraded in insulation resistance under high-temperature load even though the average number of particles per one layer of the inner ceramic layer 11 was not more than 3.

The multilayer ceramic capacitors 1 with sample numbers 20 and 25 that are out of the scope of the present invention (examples in which an amount of addition of Mn in the inner ceramic layer 11 was out of range from about 1.0 to about 3.5 parts by mole) were degraded in insulation resistance under high-temperature load even though the average number of particles per one layer of the inner ceramic layer 11 was not more than 3.

The multilayer ceramic capacitors 1 with sample numbers 32, 35, 38, and 41 that are out of the scope of the present invention (examples in which an amount of addition of a rare-earth element (Dy, Gd, Er, or Y) in the inner ceramic layer 11 was more than 0.05 part by mole) were short in mean time to failure (MTTF) even though the average number of particles per one layer of the inner ceramic layer 11 was not more than 3.

While preferred embodiments of the present invention have been described above, it is to be understood that variations and modifications will be apparent to those skilled in the art without departing from the scope and spirit of the present invention. The scope of the present invention, therefore, is to be determined solely by the following claims.

What is claimed is:

1. A multilayer ceramic capacitor, comprising:
    a multilayer body including a plurality of dielectric ceramic layers and a plurality of internal electrodes along an interface between the dielectric ceramic layers; and
    a plurality of external electrodes on an outer surface of the multilayer body and electrically connected to the internal electrodes; wherein
    each of the dielectric ceramic layers is mainly composed of a perovskite-type compound containing Ba and Ti, contains at least one of Nb and Ta, contains Mn and Al, and optionally contains Mg and a rare-earth element that is at least one of Y, Gd, Tb, Dy, Ho, and Er, with a content of Ti being 100 parts by mole; and
    (a) a total of Nb and Ta is from about 0.2 to about 1.5 part by mole;
    (b) Mg is not more than about 0.2 part by mole including 0 part by mole;
    (c) Mn is from about 1.0 to about 3.5 parts by mole;
    (d) Al is from about 1.0 to about 4.0 parts by mole; and
    (e) the rare-earth element is not more than about 0.05 part by mole including 0 part by mole; and
    an average number of particles per one layer of the dielectric ceramic layer is not more than 3.

2. The multilayer ceramic capacitor according to claim 1, wherein the multilayer body has a parallelepiped or substantially parallelepiped shape.

3. The multilayer ceramic capacitor according to claim 1, wherein the plurality of dielectric layers include a plurality of inner dielectric layers and a plurality of outer dielectric layers disposed at outer portions of the multilayer body and sandwich the plurality of inner dielectric layers.

4. The multilayer ceramic capacitor according to claim 3, wherein the plurality of outer ceramic layers are composed of a dielectric ceramic composition that is the same as that of the plurality of inner ceramic layers.

5. The multilayer ceramic capacitor according to claim 3, wherein the plurality of outer ceramic layers are composed of a dielectric ceramic composition that is different from that of the plurality of inner ceramic layers.

* * * * *